United States Patent
Hashikaki

(10) Patent No.: US 12,223,889 B2
(45) Date of Patent: Feb. 11, 2025

(54) DRIVE CIRCUIT FOR DISPLAY DEVICE

(71) Applicant: Sony Semiconductor Solutions Corporation, Kanagawa (JP)

(72) Inventor: Kouichi Hashikaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/567,232

(22) PCT Filed: May 16, 2022

(86) PCT No.: PCT/JP2022/020334
§ 371 (c)(1),
(2) Date: Dec. 5, 2023

(87) PCT Pub. No.: WO2023/007908
PCT Pub. Date: Feb. 2, 2023

(65) Prior Publication Data
US 2024/0274065 A1    Aug. 15, 2024

(30) Foreign Application Priority Data

Jul. 28, 2021 (JP) .................................. 2021-123297

(51) Int. Cl.
*G09G 3/32* (2016.01)
*G09G 3/34* (2006.01)

(52) U.S. Cl.
CPC ............. *G09G 3/32* (2013.01); *G09G 3/3426* (2013.01); *G09G 2300/0857* (2013.01);
(Continued)

(58) Field of Classification Search
None
See application file for complete search history.

(56) References Cited

U.S. PATENT DOCUMENTS

| 6,175,346 B1* | 1/2001 | Chiu ........................ G09G 3/32 345/82 |
| 2005/0017778 A1* | 1/2005 | Nogawa .................. H03K 7/08 327/165 |

(Continued)

FOREIGN PATENT DOCUMENTS

| JP | H06178238 A | * | 6/1994 |
| JP | 2011113794 A | * | 6/2011 |

OTHER PUBLICATIONS

International Search Report (PCT/ISA/210), International Application No. PCT/JP2022/020334, dated Jul. 12, 2022.

*Primary Examiner* — Dorothy Harris
(74) *Attorney, Agent, or Firm* — Michael Best & Friedrich LLP

(57) ABSTRACT

To reduce power consumption of a drive circuit for a display device. A drive circuit (10) for the display device includes a comparator (100), a PWM signal generation unit (200), and a drive unit (300). The comparator (100) is a comparator that starts comparison between a count number of pulses in an input clock signal and input comparison data in synchronization with a start signal, and includes a shift register (120) that is configured by a plurality of flip-flops in which the clock signal is input to a clock terminal and that is cascade-connected and shifts the start signal, and a selection unit (130) that selects one of outputs of the plurality of flip-flops constituting the shift register according to the comparison data and outputs the shifted start signal as a result of the comparison. The PWM signal generation unit (200) generates a PWM signal according to the result of the comparison. The drive unit (300) drives a light emitting element (11) based on the generated PWM signal.

8 Claims, 10 Drawing Sheets

(52) U.S. Cl.
CPC ............... *G09G 2310/0286* (2013.01); *G09G 2320/064* (2013.01); *G09G 2330/021* (2013.01)

(56) References Cited

U.S. PATENT DOCUMENTS

2021/0112641 A1\* 4/2021 Li .................... H05B 45/325
2023/0100812 A1\* 3/2023 Mohtashemi ........ G09G 3/3406
345/691

\* cited by examiner

RELATED ART

DRIVE CIRCUIT FOR DISPLAY DEVICE

FIELD

The present disclosure relates to a drive circuit for a display device.

BACKGROUND

A drive circuit of a display device that controls supply power and the like by PWM control is used. This PWM control is a control method for adjusting an ON period according to input data in ON/OFF control of a constant cycle. For example, in a light source device that adjusts light using a light emitting diode or the like, a light source device that adjusts light by adjusting an average current of an LED according to input data by applying PWM control to a drive current of the LED is used.

The adjustment of the ON period in the PWM control can be performed, for example, by comparing the reference signal that changes in a ramp shape with the input data for each PWM control cycle and setting the period from the start of the PWM control cycle until the reference signal exceeds the input data to the ON period. The remaining period of the PWM control cycle is the OFF period. The ON period corresponds to a light emission period of the LED, and the OFF period corresponds to a light-off period of the LED. When the input data increases, the ratio (duty) of the ON period in the PWM control cycle increases, and the average current (power) supplied to the LED can be increased.

In PWM control by a digital signal, an output of a binary counter that performs counting in synchronization with a clock signal can be used instead of a reference signal that changes in a ramp shape. The PWM control can be performed by comparing the count value of the binary counter with the input data. Specifically, counting of the binary counter is started in synchronization with the start of the PWM control cycle, and the count value and the input data are compared by the comparator. A period in which the count value is smaller than the input data is associated with the ON state, and a drive current is caused to flow through the LED. Thereafter, when the count value exceeds the input data, the state shifts to the OFF state, and the drive current of the LED is stopped. As a result, the ON period can be adjusted according to the input data, and adjustment of light of the LED can be performed.

As the above-described comparator, for example, a comparator that compares the output of the binary counter that starts counting at the start of the PWM control cycle with the input data for each corresponding bit can be used. As this comparator, a comparator that detects a match between the output of the binary counter and the input data can be used. Specifically, the PWM control can be performed by associating the period from the start of counting of the binary counter until the output of the binary counter matches the input data in all bits with the ON period. As such a comparator, a comparator (digital comparator) that detects matching by performing an exclusive OR operation for each corresponding bit of the output of the binary counter and the input data has been proposed (see, for example, Patent Literature 1).

CITATION LIST

Patent Literature

Patent Literature 1: JP H06-178238 A

SUMMARY

Technical Problem

However, in the above-described conventional technique, the logic of the exclusive OR operation output of the comparator is switched with the counting of the binary counter. This logic switching includes many switching that does not contribute to the final calculation result, and thus there is a problem that power consumption increases.

Therefore, the present disclosure proposes a comparator with low power consumption.

Solution to Problem

The present disclosure has been conceived to solve the problem described above, and the aspect thereof is a drive circuit for a display device includes: a comparator that starts comparison between a count number of pulses in a clock signal input and comparison data input in synchronization with a start signal, the comparator including: a shift register that is configured by a plurality of flip-flops in which the clock signal is input to a clock terminal and that is connected in cascade and shifts the start signal; and a selection unit that selects one of outputs of the plurality of flip-flops constituting the shift register according to the comparison data and outputs the start signal shifted as a result of the comparison; a PWM signal generation unit that generates a PWM signal according to the result of the comparison; and a drive unit that drives a light emitting element based on the PWM signal generated.

DESCRIPTION OF EMBODIMENTS

Hereinafter, embodiments of the present disclosure will be described in detail with reference to the drawings. The description will be given in the following order. Note that, in each of the following embodiments, the same parts are denoted by the same reference signs, and redundant description will be omitted.

1. First Embodiment
2. Second Embodiment
3. Application Example

1. First Embodiment

[Configuration of Imaging Device]

Figure 1:
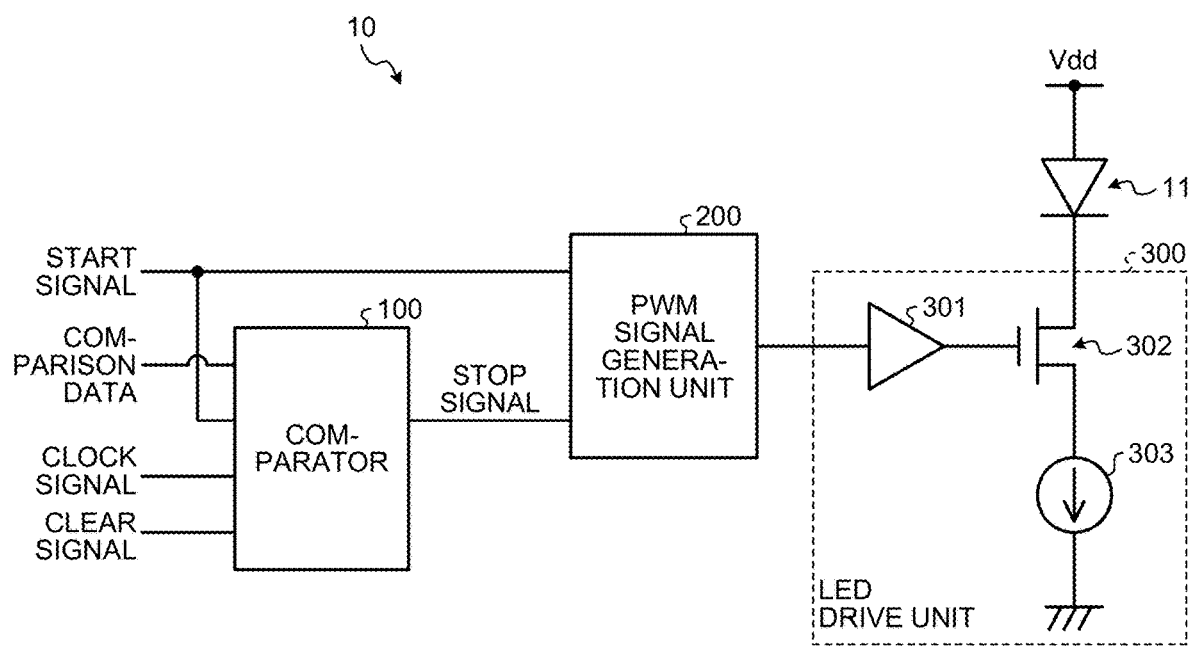
FIG. 1 is a diagram illustrating a configuration example of a light source device according to an embodiment of the present disclosure.

FIG. 1 is a diagram illustrating a configuration example of a light source device according to an embodiment of the present disclosure. The drawing is a block diagram illustrating a configuration example of a light source device 10. The light source device 10 is a device that drives a light emitting diode (LED), which is a light source, by PWM control. The light source device 10 includes an LED 11, an LED drive unit 300, a PWM signal generation unit 200, and a comparator 100.

In addition, a start signal, comparison data, a clock signal, and a clear signal are input to the light source device 10. The start signal is a pulse signal indicating the start of the control cycle of the PWM control. The comparison data is a signal corresponding to the ratio of the ON period in the PWM control, and is a signal configured by a digital signal having a predetermined bit width. The clock signal is a signal serving as a reference of the operation of the logic circuit. The clear signal is a signal for stopping the PWM control. These signals are input from a device using the light source device 10.

The LED 11 is an element that emits light. The LED 11 is an element that emits light with luminance corresponding to the supplied drive current. In the LED 11 in the drawing, an anode is connected to a power supply line Vdd that supplies power, and a cathode is connected to the LED drive unit 300.

The LED drive unit 300 drives the LED 11. The LED drive unit 300 supplies a drive current to the LED 11 to drive. The LED drive unit 300 in the drawing supplies a suction current (sink current) to the LED 11. In addition, the LED drive unit 300 adjusts the drive current based on the input PWM signal, and adjusts the luminance of the LED 11.

The LED drive unit 300 in the drawing includes a MOS transistor 302, a constant current circuit 303, and a gate drive unit 301. The MOS transistor 302 is a switch element that controls a drive current of the LED 11. The MOS transistor 302 has a drain connected to the cathode of the LED 11, a source connected to the constant current circuit 303, and a gate connected to the output of the gate drive unit 301. The constant current circuit 303 is a circuit that is connected between the source of the MOS transistor 302 and the ground line and supplies a constant current. The constant current circuit 303 in the drawing supplies a drive current of the LED 11. The gate drive unit 301 drives the gate of the MOS transistor 302. The gate drive unit 301 in the drawing generates a gate drive signal based on the PWM signal output from the PWM signal generation unit 200 described later, and supplies the gate drive signal to the gate of the MOS transistor 302.

The PWM signal generation unit 200 generates a PWM signal based on a comparison result of the comparator 100 described later. The PWM signal generation unit 200 generates a PWM control signal for PWM controlling the LED 11 and supplies the PWM control signal to the LED drive unit 300. The PWM signal generation unit 200 in the drawing generates a PWM control signal based on a start signal and a stop signal generated by a comparator 100 described later. Details of the configuration of the PWM signal generation unit 200 will be described later.

The comparator 100 compares the comparison data with the count value of the built-in counter. When the start signal is input, the comparator 100 starts counting in synchronization with the clock signal, generates a stop signal at a timing when the count value becomes equal to the comparison data, and outputs the stop signal as a comparison result. The period from the input of the start signal to the output of the stop signal corresponds to the ON period of the PWM signal. In addition, a clear signal is input to the comparator 100. Details of the configuration of the comparator 100 will be described with reference to FIG. 2.

Note that the LED drive unit 300, the PWM signal generation unit 200, and the comparator 100 are an example of a drive circuit for the display device. The LED drive unit 300 is an example of the drive unit. The LED 11 is an example of a display element.

[Configuration of Comparator]

Figure 2:
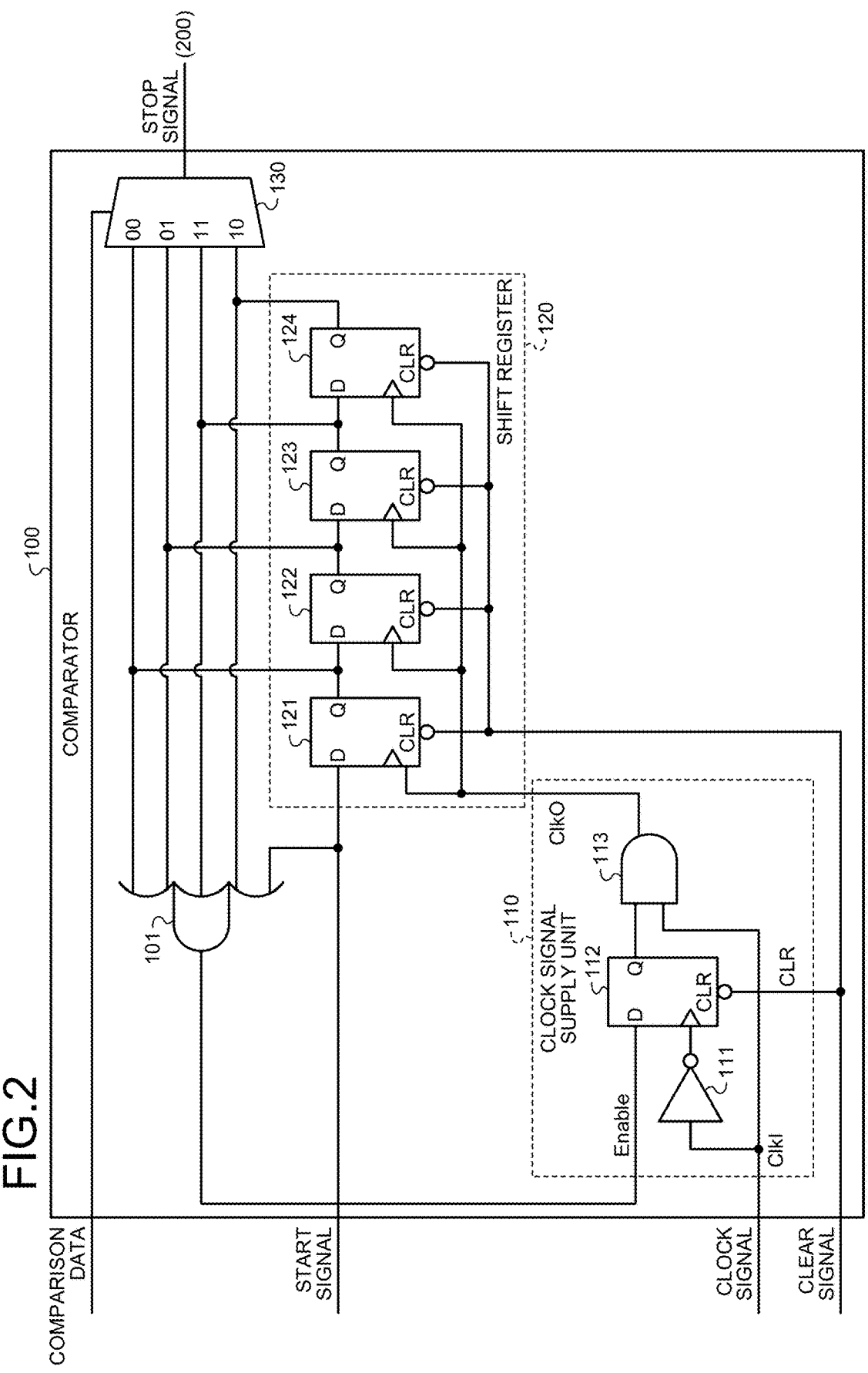
FIG. 2 is a diagram illustrating a configuration example of a comparator according to the first embodiment of the present disclosure.

FIG. 2 is a diagram illustrating a configuration example of a comparator according to the first embodiment of the present disclosure. The drawing is a block diagram illustrating a configuration example of the comparator 100. The comparator 100 is a comparator that starts comparison between the count number of pulses in the input clock signal and the input comparison data in synchronization with the start signal. The comparator 100 in the drawing includes a clock signal supply unit 110, a shift register 120, a selection unit 130, and an OR gate 101. Note that, in the drawing, the comparison data is assumed to be a digital signal having a 2-bit width.

The clock signal supply unit 110 supplies a clock signal to the shift register 120. The clock signal supply unit 110 in the drawing includes a ClkI input, an Enable input, a CLR input, and a ClkO output. A clock signal is input to the ClkI input. A clear signal is input to the CLR input. To the Enable input, a permission signal that is a signal for permitting supply of a clock signal to the shift register 120 is input. A clock signal supplied to the shift register 120 is output to the ClkO output.

The clock signal supply unit 110 includes an inverting gate 111, a D flip-flop 112, and an AND gate 113. As the AND gate 113, a two-input AND gate can be used. The ClkI input is connected to an input terminal of the inverting gate 111 and an input terminal of the AND gate 113. The Enable input is connected to the D terminal of the D flip-flop 112. The CLR input is connected to the CLR terminal of the D flip-flop 112. An output terminal of the inverting gate 111 is connected to a clock terminal of the D flip-flop 112. A Q terminal of the D flip-flop 112 is connected to an input terminal of the AND gate 113. The ClkO output is connected to the output terminal of the AND gate 113.

The clock signal supply unit 110 in the drawing transfers the clock signal input to the ClkI input to the ClkO output in a period in which the permission signal is input to the Enable input. The permission signal input to the Enable input is fetched by the D flip-flop 112 in synchronization with falling of the clock signal, and is output from the Q terminal of the D flip-flop 112 to the AND gate 113. The AND gate 113 opens and closes between the ClkI input and the ClkO output based on the permission signal input via the D flip-flop 112.

The shift register 120 shifts the input start signal. The shift register 120 is a four-stage shift register including D flip-flops 121 to 124. These D flip-flops 121 to 124 are connected in cascade. That is, the start signal is input to the D terminal of the D flip-flop 121. The Q terminal of the D flip-flop 121 is connected to the D terminal of the D flip-flop 122. The Q terminal of the D flip-flop 122 is connected to the D terminal of the D flip-flop 123. The Q terminal of the D flip-flop 123 is connected to the D terminal of the D flip-flop 124. The clock terminals of the D flip-flops 121 to 124 are commonly connected to the ClkO output of the clock signal supply unit 110. The clear signal is commonly input to the CLR terminals of the D flip-flops 121 to 124. The Q terminals of the D flip-flops 121 to 124 are connected to the 00 input, the 01 input, the 11 input, and the 10 input of the selection unit 130, respectively.

The shift register 120 can count the number of pulses of the clock signal. This is because the shift position of the above-described start signal corresponds to the number of pulses of the input clock signal on a one-to-one basis. For example, when one pulse (cycle) of the clock signal is input, the shifted start signal is output to the Q terminal of the D flip-flop 121. When two pulses (cycles) of the clock signal are input, the shifted start signal is output to the Q terminal of the D flip-flop 122. That is, the four-stage shift register 120 can count up to four clock signals.

The selection unit 130 selects one of the outputs of the shift register 120. The selection unit 130 in the drawing can be configured by a selector or a multiplexer including a selection input and four data inputs. For convenience, the 4 data inputs are labeled 00 input, 01 input, 11 input, and 10 input. The numbers attached to these data inputs represent input signals of the selection input when the data input is selected. For example, the input 00 is selected in a case where the value "00" is input to the selection input, and the data signal input to the input 00 is output to the output terminal of the selection unit 130. As described above, the Q terminals of the D flip-flops 121 to 124 are connected to the 00 input, the 01 input, the 11 input, and the 10 input of the selection unit 130, respectively. The selection unit 130 selects one of the outputs of the D flip-flops 121 to 124 of the shift register 120 based on the comparison data input to the selection input, and outputs the shifted start signal.

Therefore, the selection unit 130 can acquire the start signal of the shift amount according to the comparison data, and can acquire the count value of the number of pulses of the clock signal according to the comparison data. As a result, the selection unit 130 can determine whether or not the comparison data is equal to the count value of the number of pulses of the clock signal. The selection unit 130 outputs the start signal shifted at the timing when the count value of the number of pulses of the clock signal becomes the same as that of the comparison data. This output signal corresponds to the stop signal.

As described above, the selection unit 130 selects the output of the shift register 120 corresponding to the count value of the number of pulses of the clock signal according to the comparison data and outputs the selected output as the stop signal. A difference of one clock cycle occurs between the value of the comparison data and the count value of the number of pulses of the selected clock signal. Specifically, in a case where the comparison data has the value "00", the count value "1" of the number of pulses of the clock signal is selected and deviated from the comparison data by the value "1". Therefore, the PWM signal generation unit 200 described later performs processing of delaying the start signal.

The OR gate 101 is a gate that generates the above-described permission signal. As the OR gate 101, a 5-input OR gate can be used. The start signal and the Q terminals of the D flip-flops 121 to 124 are connected to the input terminal of the OR gate 101. The output terminal of the OR gate 101 is connected to the Enable input of the clock signal supply unit 110.

[Configuration of PWM Signal Generation Unit]

Figure 3:
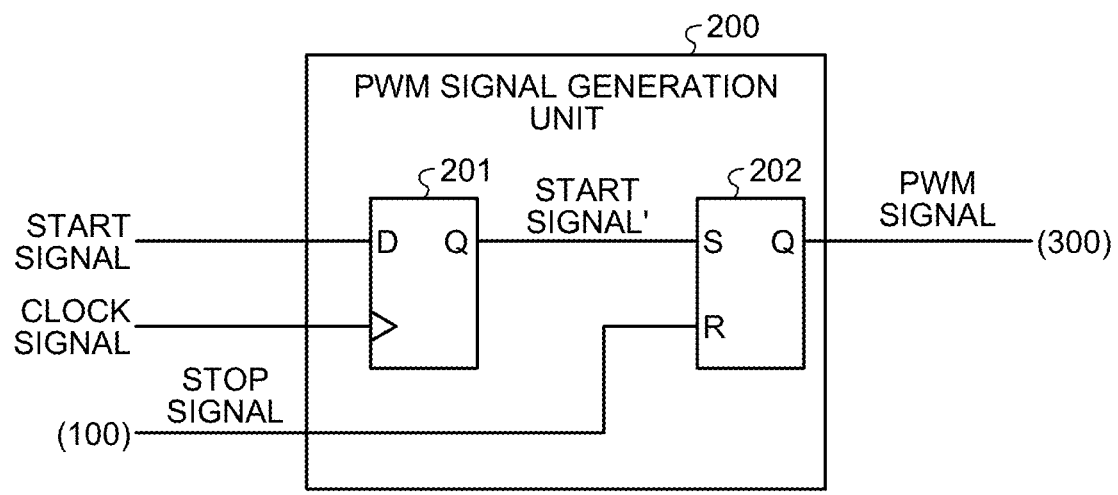
FIG. 3 is a diagram illustrating a configuration example of a PWM signal generation unit according to the embodiment of the present disclosure.

FIG. 3 is a diagram illustrating a configuration example of a PWM signal generation unit according to the embodiment of the present disclosure. The drawing is a block diagram illustrating a configuration example of the PWM signal generation unit 200. The PWM signal generation unit 200 is a circuit that generates a PWM signal based on the start signal and the stop signal. The PWM signal generation unit 200 includes a D flip-flop 201 and an RS flip-flop 202. A start signal is input to a D terminal of the D flip-flop, and a clock signal is input to a clock input. A Q terminal of the D flip-flop 201 is connected to a set terminal of the RS flip-flop 202. A stop signal output from the comparator 100 is input to a reset terminal of the RS flip-flop 202. A Q terminal of the RS flip-flop 202 corresponds to an output terminal of the PWM signal generation unit 200 and is connected to the LED drive unit 300.

The D flip-flop 201 delays the start signal by one clock cycle. This is to compensate for a difference between the value of the comparison data and the count value of the number of pulses of the clock signal to be selected in the selection unit 130 described above. The D flip-flop 201 outputs a start signal' that is a signal obtained by delaying the start signal.

The RS flip-flop 202 generates a PWM signal. The RS flip-flop 202 generates and outputs a PWM signal having a value "1" in a period from the rising of the start signal' to the rising of the stop signal. Note that a reset-prioritized RS flip-flop can be used as the RS flip-flop 202. Accordingly, in a case where the start signal' and the stop signal are input at the same timing, it is possible to generate a PWM signal whose ON period is a value "0".

[PWM Signal Generation]

Figure 4:
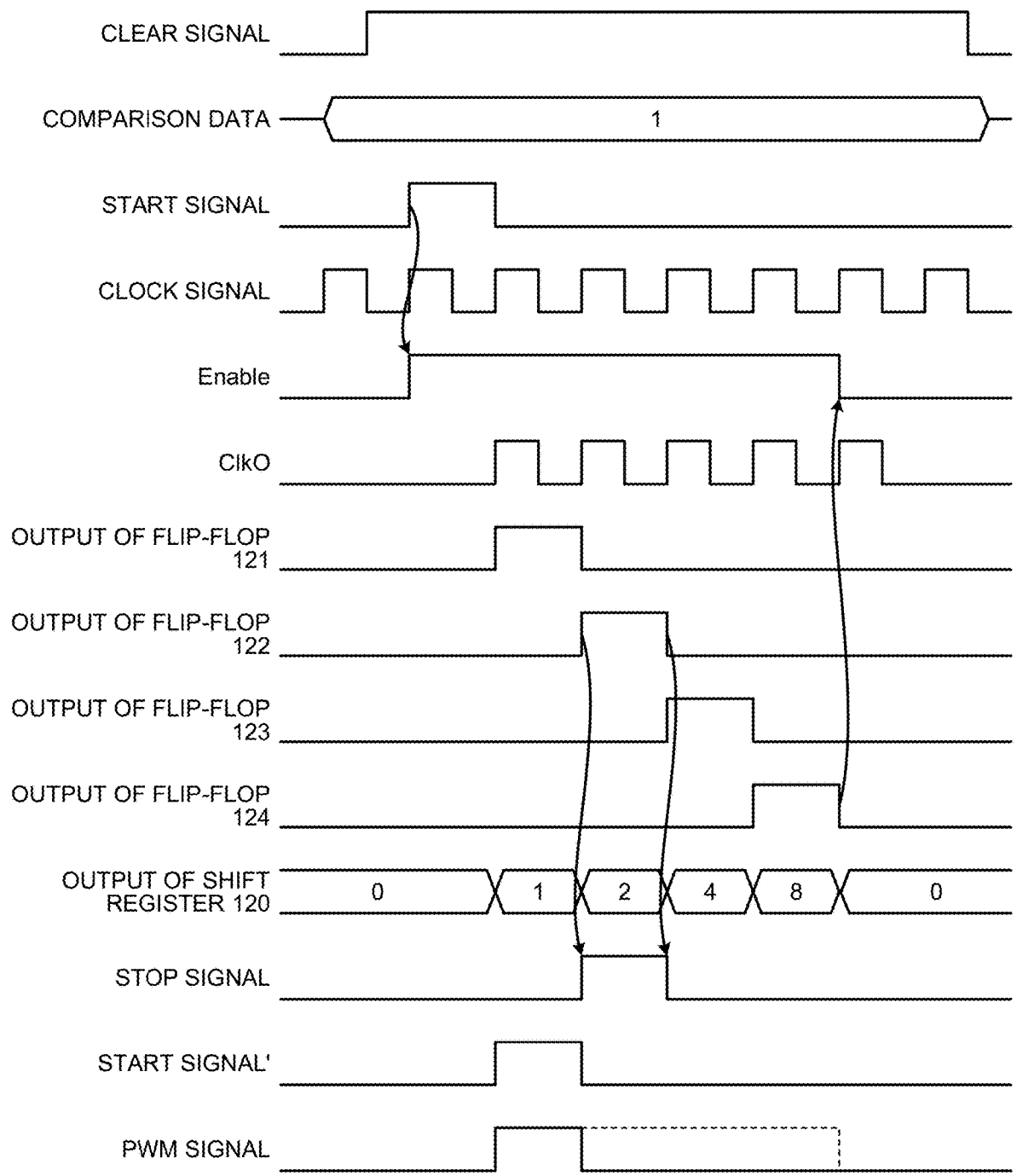
FIG. 4 is a diagram illustrating an example of PWM signal generation according to the first embodiment of the present disclosure.

FIG. 4 is a diagram illustrating an example of PWM signal generation according to the first embodiment of the present disclosure. The drawing is a timing chart illustrating an example of generation of a PWM signal in the light source device 10. In the drawing, "clear signal", "comparison data", "start signal", and "clock signal" represent the clear signal, the comparison data, the start signal, and the clock signal input to the light source device 10 of FIG. 1, respectively. Note that "comparison data" in the drawing represents a signal having a 2-bit width. In addition, as the "start signal", a signal having a pulse width of one clock cycle is used. "Enable" and "ClkO" represent a permission signal of an Enable input and a clock signal of a ClkO output of the clock signal supply unit 110. "Output of flip-flop 121", "output of flip-flop 122", "output of flip-flop 123", and "output of flip-flop 124" represent signals of the Q terminal of D flip-flop 121, the Q terminal of D flip-flop 122, the Q terminal of D flip-flop 123, and the Q terminal of D flip-flop 124, respectively.

"Output of shift register 120" indicates the value of the Q terminals of D flip-flops 121 to 124 of shift register 120. "Output of the shift register 120" represents a signal having a 4-bit width. "Stop signal" represents a stop signal output from the comparator 100. "Start signal'" represents a start signal' outputted from the D flip-flop 201 described in FIG. 3. "PWM signal" indicates a PWM signal output from the PWM signal generation unit 200.

First, the clear signal having the value "0" is input, and the D flip-flops included in the comparator 100 are reset. Next, the clear signal transitions to the value "1", and the reset states of the D flip-flops included in the comparator 100 are released. Next, comparison data (value "1") is input. Next, a start signal having a value "1" is input in synchronization with rising of the clear signal. When this start signal is input, a permission signal having a value "1" is input to the Enable input. With the input of the permission signal, the clock signal supply unit 110 starts supplying the clock signal, and the clock signal is output to the ClkO output. In the drawing, a clock signal of five pulses is output.

The start signal is shifted by the D flip-flops 121 to 124 in synchronization with the clock signal. According to this shift, the output of the shift register 120 changes to the values "1", "2", "4", and "8". In the drawing, since the comparison data has the value "1", the Q terminal of the D flip-flop 122 is selected by the selection unit 130, and the shifted start signal is output as the stop signal. Furthermore, the start signal' becomes a signal obtained by delaying the start signal by one clock cycle. A PWM signal is generated based on the start signal' and the stop signal. As illustrated in the drawing, it is possible to generate a PWM signal that becomes ON period during a period from the rising of the start signal' to the rising of the stop signal. The dotted line of the "PWM signal" in the drawing represents the maximum pulse width of the PWM signal during the ON period. Thereafter, the supply of the comparison data is stopped, and the clear signal transitions to the value "0".

Since the start signal' and the stop signal are signals synchronized with the clock signal, the accuracy of the timing can be improved by generating the PWM signal based on the start signal' and the stop signal. In addition, since the stop signal is a signal output from the Q terminal of the shift register 120 via the selection unit 130, a delay with respect to the clock signal can be shortened. The timing margin can be easily secured.

Note that the configuration of the comparator 100 is not limited to this example. For example, the signal at the Q terminal of the D flip-flop 121 can also be used as the start signal'. In this case, the D flip-flop 201 of the PWM signal generation unit 200 can be omitted. In addition, shift registers 120 having different numbers of stages can also be used.

COMPARATIVE EXAMPLE

Figure 5A:
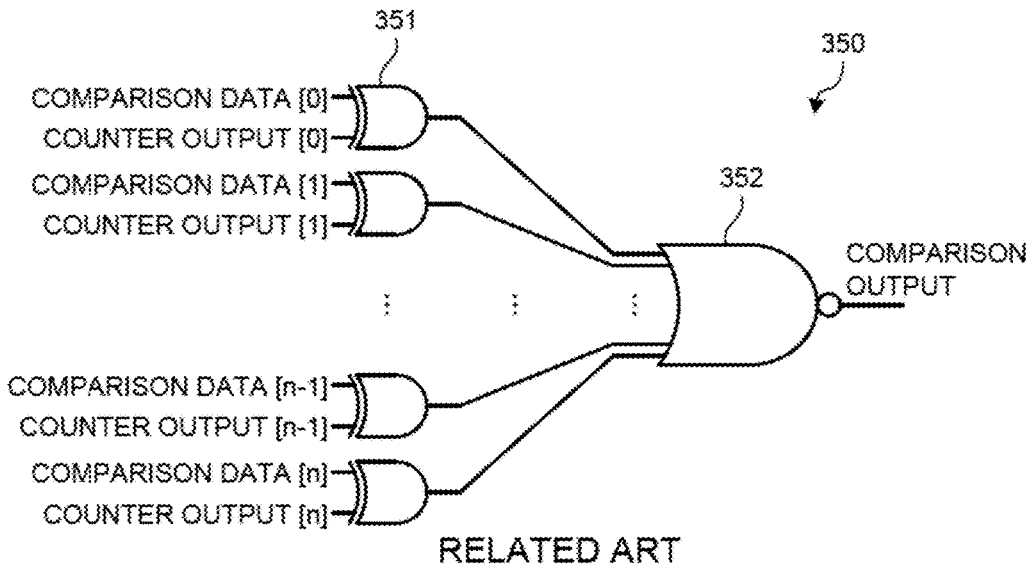
FIG. 5A is a diagram illustrating a comparator according to a conventional technique.

FIG. 5A is a diagram illustrating a comparator of a conventional technique. The drawing is a diagram illustrating a configuration example of a comparator 350 which is a comparative example of the present disclosure. The comparator 350 in the drawing compares the n-bit comparison data with the output of the n-bit binary counter. The comparator 350 includes a plurality of EOR gates 351 and a NOR gate 352. The plurality of EOR gates 351 compare the comparison data and the output of the binary counter for each bit. In a case where all the outputs (comparison results) of the plurality of EOR gates 351 match, the output of the NOR gate 352 has the value "1".

Figure 5B:
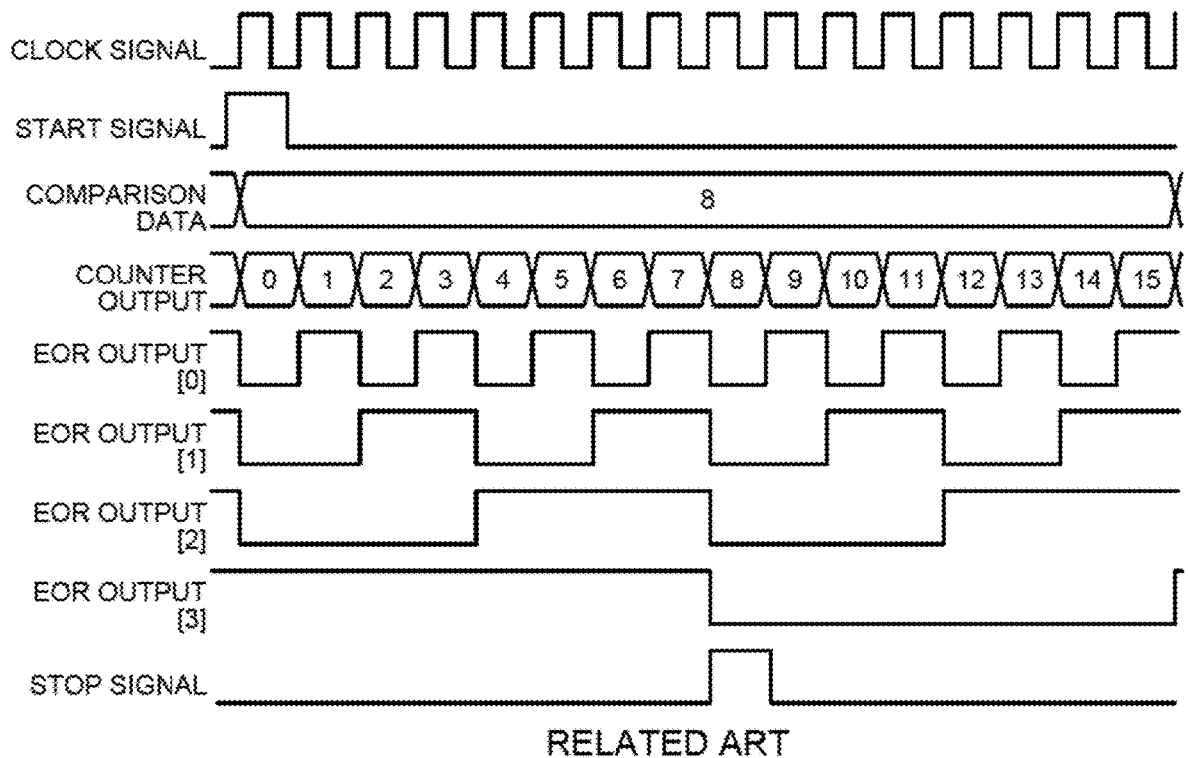
FIG. 5B is a diagram illustrating a comparative example in the comparator of the conventional technique.

FIG. 5B is a diagram illustrating a comparative example in the comparator of the conventional technique. The drawing is a timing chart illustrating a comparative example of the comparator 350. The drawing illustrates an example of a case where the data widths of the comparison data and the binary counter are 4 bits. "Counter output" in the drawing represents the output of the binary counter. "EOR output [0]", "EOR output [1]", "EOR output [2]", and "EOR output [3]" represent the outputs of the EOR gates 351, respectively. Among them, [0] and the like represent bits of the binary counter output and the comparison data. Note that the drawing illustrates an example in a case where the comparison data has the value "8".

The output of the binary counter is cleared at the rising of the clock signal when the start signal has the value "1". Thereafter, the binary counter performs counting in synchronization with the clock signal, and sequentially outputs values "0" to "15". The output and the comparison data are compared for each bit by the plurality of EOR gates 351. When the output of the binary counter becomes the value "8", "EOR output [0]", "EOR output [1]", "EOR output [2]", and "EOR output [3]" become the value "0" at the same time, and the comparison output (stop signal) becomes the value "1". In this manner, the comparator 350 performs comparison.

As illustrated in the drawing, in the binary counter, the value of at least one bit is inverted in synchronization with the clock signal. Therefore, the output of the EOR gate 351 is also inverted, the number of logical operations up to the comparison result is increased, and the power consumption is also increased. On the other hand, the comparator 100 of FIG. 2 can reduce the number of reversals of the output of the flip-flop 121 and the like as illustrated in the timing chart of FIG. 4. An increase in power consumption can be prevented.

As described above, the comparator 100 of the present disclosure selects the output of the shift register 120 according to the comparison data, and outputs the start signal shifted by the shift register 120 as the comparison result, thereby comparing the count number of the pulses in the clock signal with the comparison data. As a result, since the switching of the signal logic accompanying the comparison is limited to the switching of the signal logic accompanying the shift in the shift register 120, the power consumption can be reduced. In addition, the power consumption can be further reduced by stopping the supply of the clock signal other than at the time of the comparison operation in the comparator 100 using the clock signal supply unit 110.

2. Second Embodiment

The comparator 100 of the above-described first embodiment supplies a single clock signal to the shift register 120. On the other hand, a comparator 100 according to a second embodiment of the present disclosure is different from the above-described first embodiment in that a plurality of clock signals having different phases is supplied to a shift register 120.

[Configuration of Comparator]

Figure 6:
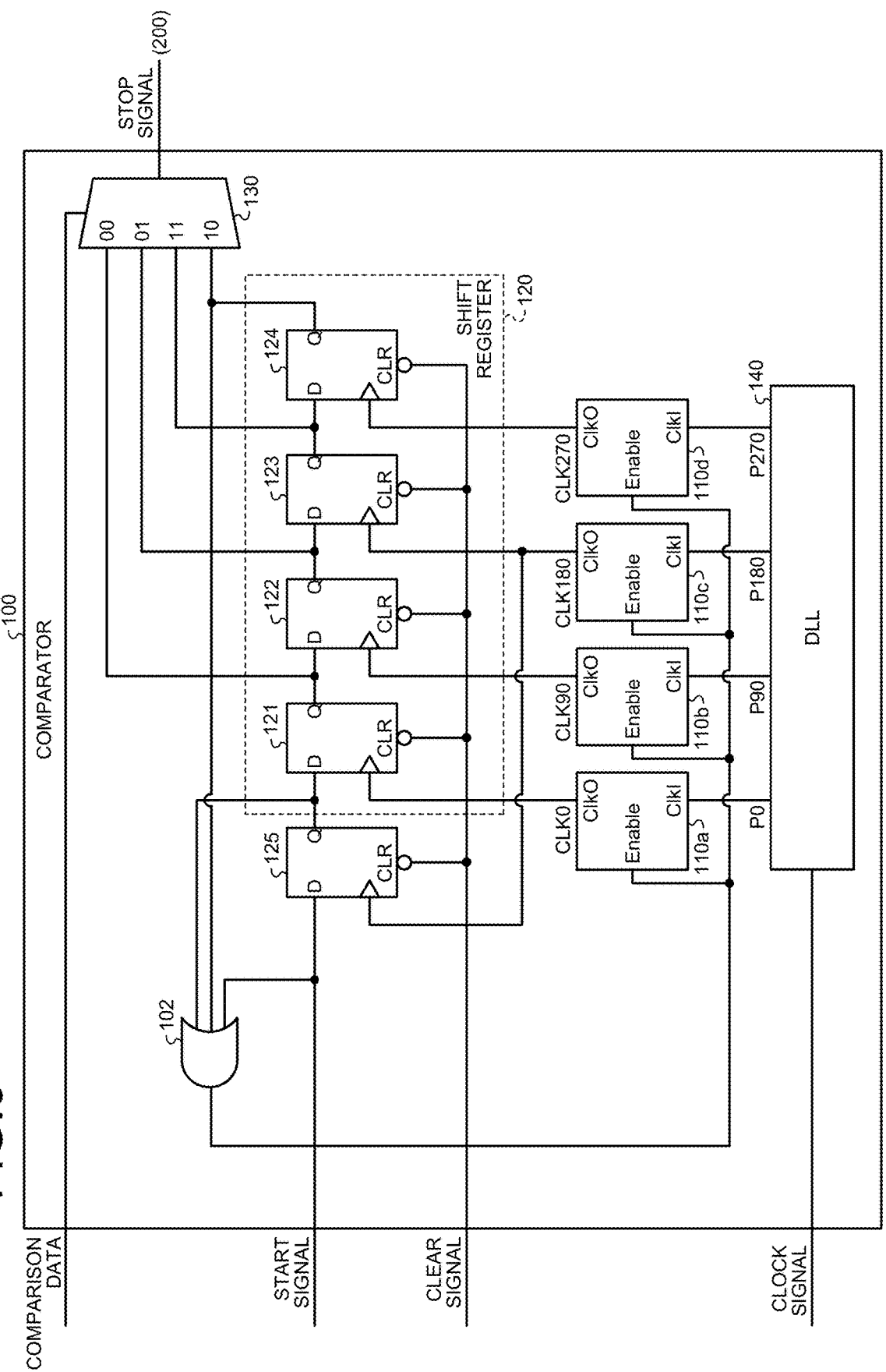
FIG. 6 is a diagram illustrating a configuration example of a comparator according to the second embodiment of the present disclosure.

FIG. 6 is a diagram illustrating a configuration example of a comparator according to the second embodiment of the present disclosure. The drawing is a block diagram illustrating a configuration example of the comparator 100 similarly to FIG. 2. The comparator 100 is different from the comparator in FIG. 2 in that clock signal supply units 110a, 110b, 110c, and 110d are included instead of the clock signal supply unit 110, an OR gate 102 is included instead of the OR gate 101, and DLL 140 and a D flip-flop 125 are further included.

The DLL 140 includes a delay locked loop (DLL) and generates a clock signal delayed from an input clock signal by a predetermined time. The DLL 140 in the drawing generates and outputs clock signals delayed by 0 degrees, 90 degrees, 180 degrees, and 270 degrees with respect to the clock signal. In the drawing, clock signals delayed by 0 degrees, 90 degrees, 180 degrees, and 270 degrees are denoted as P0, P90, P180, and P270, respectively.

The clock signal supply units 110a, 110b, 110c, and 110d each output the clock signal generated by the DLL 140 to ClkO based on the permission signal. The clock signal supply unit 110a outputs the clock signal P0 input to the ClkI input to the ClkO output. The clock signal (CLK0) output from the clock signal supply unit 110a is a clock signal having the same phase as the clock signal input to the comparator 100, and is input to the clock terminal of the D flip-flop 121. The clock signal supply unit 110b outputs the clock signal P90 input to the ClkI input to the ClkO output. The clock signal (CLK90) output from the clock signal supply unit 110b is a clock signal delayed by 90 degrees with respect to the clock signal input to the comparator 100, and is input to the clock terminal of the D flip-flop 122.

The clock signal supply unit 110c outputs the clock signal P180 input to the ClkI input to the ClkO output. The clock signal (CLK180) output from the clock signal supply unit 110c is a clock signal delayed by 180 degrees with respect to the clock signal input to the comparator 100, and is input to the clock terminal of the D flip-flop 123. The clock signal supply unit 110d outputs the clock signal P270 input to the ClkI input to the ClkO output. The clock signal (CLK270) output from the clock signal supply unit 110d is a clock signal delayed by 270 degrees with respect to the clock signal input to the comparator 100, and is input to the clock terminal of the D flip-flop 124.

The D flip-flop 125 delays the start signal by one clock cycle. A start signal is input to the D terminal of the D flip-flop 125, and CLK180 is input to the clock terminal. A clear signal is input to the CLR terminal, and the Q terminal is connected to the D terminal of the D flip-flop 121. Note that a clock signal other than CLK180 can also be input to the clock terminal of D flip-flop 125.

The OR gate 102 is a gate that generates a permission signal similarly to the OR gate 101. As the OR gate 102, a three-input OR gate can be used. The start signal, the Q terminal of the D flip-flop 125, and the Q terminal of the D flip-flop 124 are connected to the input of the OR gate 102. The output terminal of the OR gate 102 is connected to the Enable input of each of the clock signal supply units 110a, 110b, 110c, and 110d.

[PWM Signal Generation]

Figure 7:
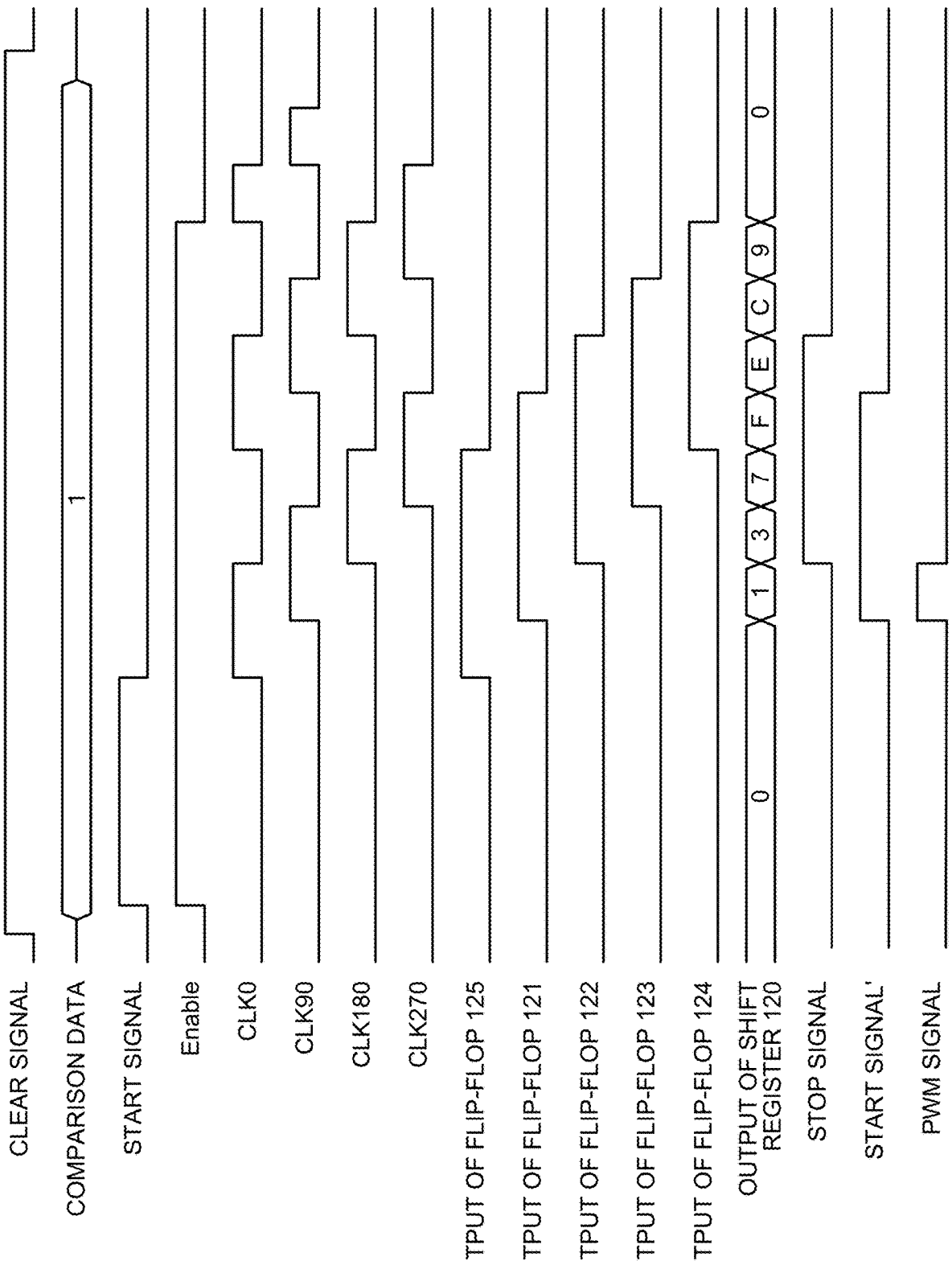
FIG. 7 is a diagram illustrating an example of PWM signal generation according to the second embodiment of the present disclosure.

FIG. 7 is a diagram illustrating an example of PWM signal generation according to the second embodiment of the present disclosure. Similarly to FIG. 4, the drawing is a timing chart illustrating an example of generation of a PWM signal in the light source device 10. In the drawing, "CLK0", "CLK90", "CLK180", and "CLK270" represent CLK0, CLK90, CLK180, and CLK270 respectively output from the clock signal supply units 110a, 110b, 110c, and 110d. "Output of flip-flop 125" represents a signal of the Q terminal of the D flip-flop 125. Further, the output of the shift register 120 is indicated by a 16 decimal number. Otherwise, the same labels as in FIG. 4 are used.

As illustrated in the drawing, CLK0, CLK90, CLK180, and CLK270 are clock signals having phases different from each other by 90 degrees. The start signal is shifted by these clock signals in the D flip-flop 125 and the D flip-flops 121 to 124 constituting the shift register 120. This shift is shifted by 90 degrees (¼ of the cycle of the clock signal). Therefore, the output of the shift register 120 changes to the values "1", "3", "7", "F", "E", "C", and "9".

Since the comparison data has the value "1", the D flip-flop 122 is selected, and the start signal of the Q terminal is output as the stop signal. This stop signal is a signal shifted by ¼ of the clock cycle from the start signal'. Therefore, the ON period of the PWM signal is ¼ of the clock cycle.

Note that the configuration of the comparator 100 is not limited to this example. For example, a clock signal having a phase difference other than 90 degrees can be used to shift the start signal in the shift register 120.

The configuration of the light source device 10 other than this is similar to the configuration of the light source device 10 in the first embodiment of the present disclosure, and thus the description thereof will be omitted.

As described above, the comparator 100 according to the second embodiment of the present disclosure shifts the shift register 120 by a plurality of clock signals having different phases. As a result, the PWM control width can be made shorter than the cycle of the clock signal. The accuracy of the PWM control can be improved without increasing the frequency of the clock signal.

3. Application Example

The technology according to the present disclosure (present technology) can be applied to various products. For example, the present technology can be applied to a backlight panel.

[Configuration of Backlight Panel]

Figure 8:
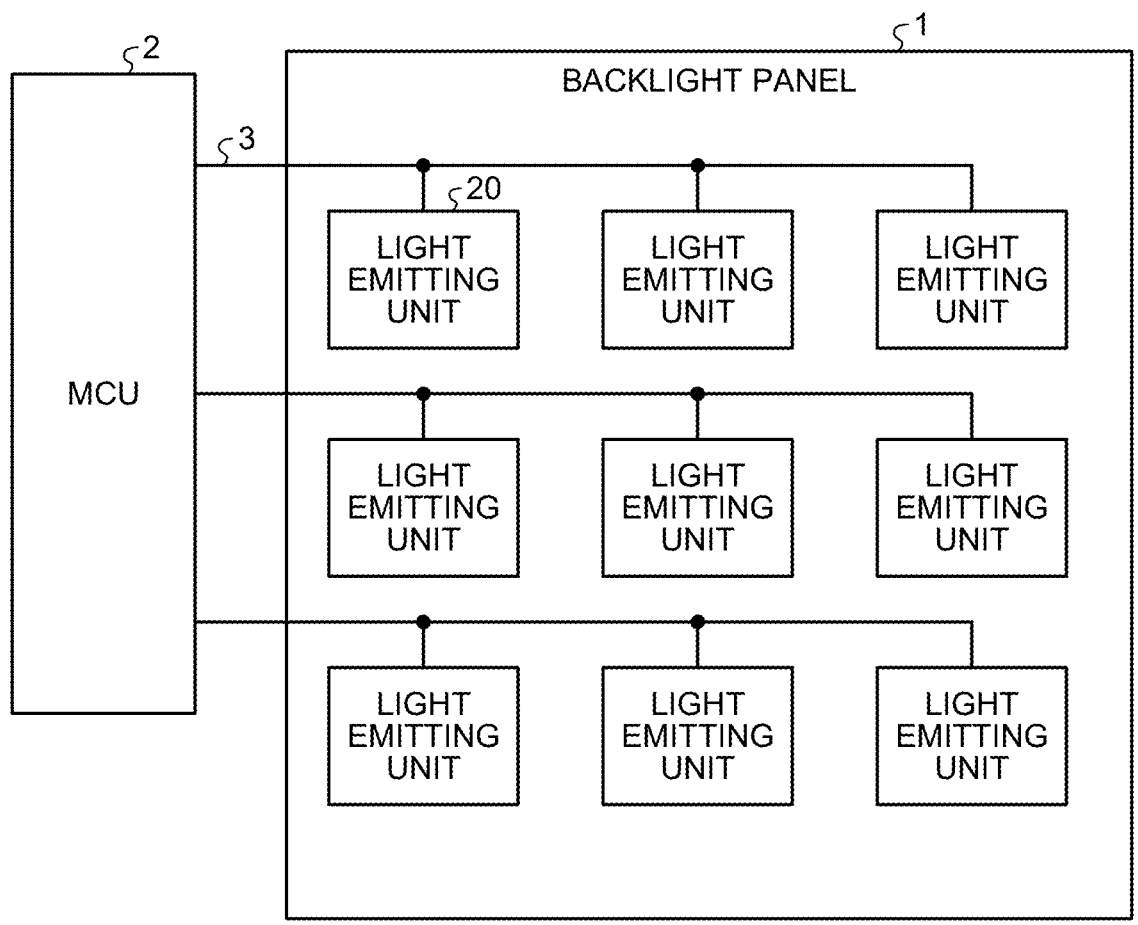
FIG. 8 is a diagram illustrating a configuration example of a backlight panel to which the present technology can be applied.

FIG. 8 is a diagram illustrating a configuration example of a backlight panel to which the present technology can be applied. The drawing is a block diagram illustrating a configuration example of a backlight panel 1. The backlight panel 1 is a device used as a backlight of a display device such as a liquid crystal panel. Note that the drawing further illustrates a micro controller unit (MCU) 2 that controls the backlight panel 1.

The backlight panel 1 is configured by arranging a plurality of light emitting units 20 in a matrix. The backlight panel 1 in the drawing illustrates an example in which the light emitting units 20 are arranged in three rows and three columns. The light emitting unit 20 includes an LED 11 and emits light. A control signal is output from the MCU 2 to the light emitting unit 20 via a signal line 3.

Note that the backlight panel 1 is an example of a display device. Note that the present technology can also be applied to display devices such as a micro LED panel and an OLED panel.

[Configuration of Light Emitting Unit]

Figure 9:
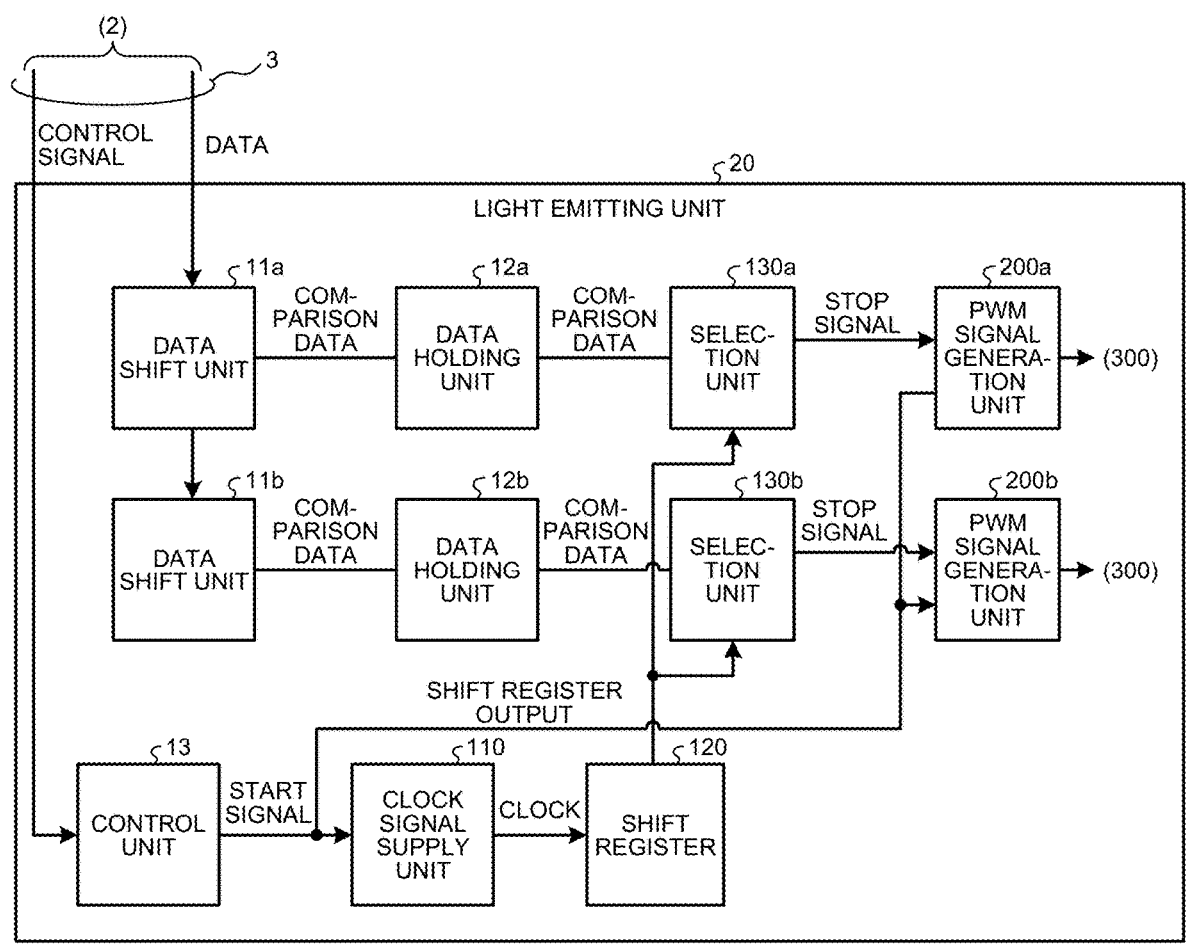
FIG. 9 is a diagram illustrating a configuration example of a light emitting unit to which the present technology can be applied.

FIG. 9 is a diagram illustrating a configuration example of a light emitting unit to which the present technology can be applied. The drawing is a block diagram illustrating a configuration example of the light emitting unit 20. The light emitting unit 20 in the drawing includes data shift units 11a and 11b, data holding units 12a and 12b, selection units 130a and 130b, PWM signal generation units 200a and 200b, a clock signal supply unit 110, and a shift register 120. Note that the light emitting unit 20 in the drawing further includes an LED drive unit 300 and an LED 11 (not illustrated). In addition, a control signal and data are input to the light emitting unit 20 via the signal line 3. This data is data for PWM control of the LED 11 and is data based on a serial signal. Note that the clock signal supply unit 110, the shift register 120, and the selection units 130a and 130b in the drawing constitute a comparator. This comparator represents an example in which the output of the shift register 120 is commonly used by the two selection units 130 (selection units 130a and 130b).

The data shift units 11a and 11b convert data of a serial signal into a parallel signal. A shift register can be used for the data shift units 11a and 11b. The data shift units 11a and 11b are connected in cascade, and generate two pieces of comparison data from input data.

The data holding units 12a and 12b hold the comparison data generated by the data shift units 11a and 11b, respectively. The comparison data held by the data holding units 12a and 12b is output to the selection units 130a and 130b.

A control unit 13 controls the entire light emitting unit 20. Furthermore, the control unit 13 generates a start signal and outputs the start signal to the clock signal supply unit 110 and the selection units 130a and 130b.

As the clock signal supply unit 110 and the shift register 120 in the drawing, the clock signal supply unit 110 and the shift register 120 described in FIG. 2 can be used.

As the selection units 130a and 130b, the selection unit 130 described in FIG. 2 can be used. The selection units 130a and 130b individually generate stop signals and output the stop signals to the PWM signal generation units 200a and 200b, respectively.

As the PWM signal generation units 200a and 200b, the PWM signal generation unit 200 described in FIG. 3 can be used.

[Another Configuration of Light Emitting Unit]

Figure 10:
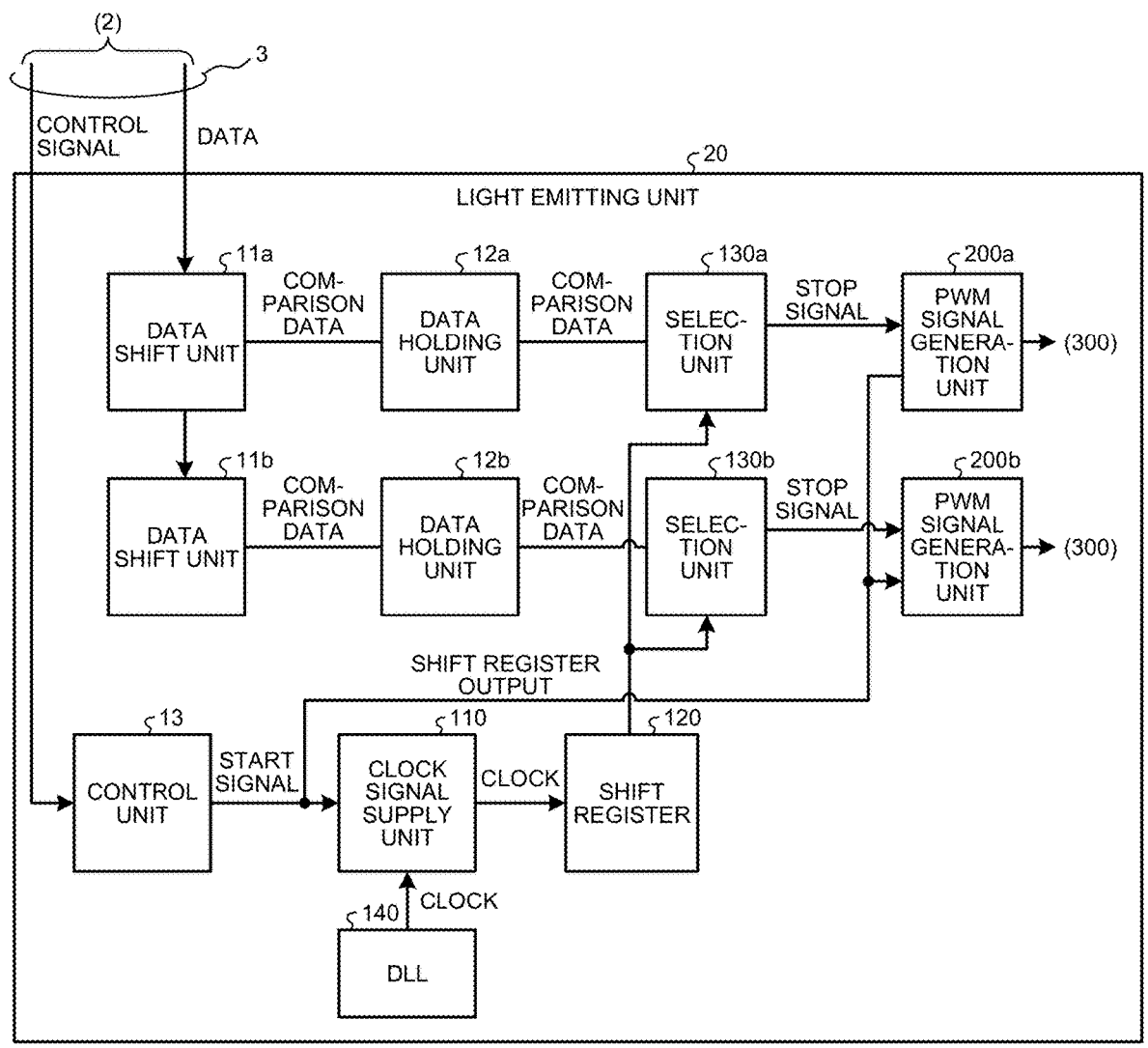
FIG. 10 is a diagram illustrating another configuration example of the light emitting unit to which the present technology can be applied.

FIG. 10 is a diagram illustrating another configuration example of the light emitting unit to which the present technology can be applied. The drawing is a block diagram illustrating a configuration example of the light emitting unit 20 similarly to FIG. 9. The light emitting unit 20 in the drawing is different from the light emitting unit 20 in FIG. 9 in further including a DLL 140.

The comparator in the drawing can have a configuration similar to that of the comparator 100 described in FIG. 6. In addition, the DLL 140 described in FIG. 6 can be used as the DLL 140. Note that the clock signal supply units 110a, 110b, 110c, and 110d described in FIG. 6 are used as the clock signal supply unit 110 in the drawing.

(Effects)

The comparator is a comparator that starts comparison between the count number of pulses in an input clock signal and input comparison data in synchronization with a start signal, and includes a shift register 120 and a selection unit 130. The shift register 120 includes a plurality of flip-flops (D flip-flops 121 to 124) in which the clock signal is input to a clock terminal and connected in cascade, and shifts the start signal. One of outputs of the plurality of flip-flops (D flip-flops 121 to 124) constituting the shift register 120 is selected according to the comparison data, and the shifted start signal is output as a result of the comparison. As a result, switching of the logic of the signal can be reduced, and power consumption can be reduced.

In addition, in the shift register 120, the clock signal may be commonly input to the plurality of cascade-connected flip-flops (D flip-flops 121 to 124).

In addition, in the shift register, the clock signals having different phases may be input to adjacent flip-flops in the cascade connection. Thus, the PWM control can be performed in a period shorter than the cycle of the clock signal.

Furthermore, a clock signal supply unit 110 that supplies the clock signal to the shift register 120 in a period from the input of the start signal to the completion of the shift of the start signal may be further included. As a result, the power consumption can be further reduced.

Note that the DLL 140 in the drawing can also be configured to be shared by the plurality of light emitting units 20.

Note that the effects described in the present specification are merely examples and are not limited, and other effects may be provided.

Note that the present technology can also have the following configurations.

(1)
A drive circuit for a display device, comprising:
a comparator that starts comparison between a count number of pulses in a clock signal input and comparison data input in synchronization with a start signal, the comparator including: a shift register that is configured by a plurality of flip-flops in which the clock signal is input to a clock terminal and that is connected in cascade and shifts the start signal; and a selection unit that selects one of outputs of the plurality of flip-flops constituting the shift register according to the comparison data and outputs the start signal shifted as a result of the comparison;
a PWM signal generation unit that generates a PWM signal according to the result of the comparison; and
a drive unit that drives a light emitting element based on the PWM signal generated.

(2)
The drive circuit for the display device according to the above (1), wherein the clock signal is commonly input to the plurality of flip-flops cascade-connected in the shift register.

(3)
The drive circuit for the display device according to the above (1), wherein the clock signals having different phases are input to the flip-flops adjacent in cascade connection in the shift register.

(4)
The drive circuit for the display device according to any one of the above (1) to (3), further comprising
a clock signal supply unit that supplies the clock signal to the shift register during a period from an input of the start signal to an end of a shift of the start signal.

REFERENCE SIGNS LIST

1 BACKLIGHT PANEL
10 LIGHT SOURCE DEVICE
11 LED
20 LIGHT EMITTING UNIT
100 COMPARATOR
110, 110a, 110b, 110c, 110d CLOCK SIGNAL SUPPLY UNIT
120 SHIFT REGISTER
121 to 125, 201 D FLIP-FLOP
130, 130a, 130b SELECTION UNIT
140 DLL
202 RS FLIP-FLOP
300 LED DRIVE UNIT
301 GATE DRIVE UNIT

The invention claimed is:

1. A drive circuit for a display device, comprising:
a comparator that starts comparison between a count number of pulses in a clock signal input and comparison data input in synchronization with a start signal, the comparator including: a shift register that is configured by a plurality of flip-flops in which the clock signal is input to a clock terminal and that is connected in cascade and shifts the start signal; and a selection unit that selects one of outputs of the plurality of flip-flops constituting the shift register according to the comparison data and outputs the start signal shifted as a result of the comparison;
a PWM signal generation unit that generates a PWM signal according to the result of the comparison; and
a drive unit that drives a light emitting element based on the PWM signal generated.

2. The drive circuit for the display device according to claim 1, wherein the clock signal is commonly input to the plurality of flip-flops cascade-connected in the shift register.

3. The drive circuit for the display device according to claim 1, wherein respective clock signals having different phases are input to respective flip-flops that are adjacent in cascade connection in the shift register.

4. The drive circuit for the display device according to claim 1, further comprising a clock signal supply unit that supplies the clock signal to the shift register during a period from an input of the start signal to an end of a shift of the start signal.

5. A drive circuit for a display device, comprising:
a comparator that starts comparison between a count number of pulses in a clock signal input and comparison data input in synchronization with a start signal, the comparator including: a shift register that is configured by a plurality of flip-flops in which the clock signal is input to a clock terminal and that is connected in cascade and shifts the start signal; and a selection circuit that selects one of outputs of the plurality of flip-flops constituting the shift register according to the comparison data and outputs the start signal shifted as a result of the comparison;
PWM signal generation circuitry configured to generate a PWM signal according to the result of the comparison; and
drive circuitry configured to drive a light emitting element based on the PWM signal generated.

6. The drive circuit for the display device according to claim 5, wherein the clock signal is commonly input to the plurality of flip-flops cascade-connected in the shift register.

7. The drive circuit for the display device according to claim 5, wherein respective clock signals having different phases are input to respective flip-flops that are adjacent in cascade connection in the shift register.

8. The drive circuit for the display device according to claim 5, further comprising clock signal supply circuitry configured to supply the clock signal to the shift register during a period from an input of the start signal to an end of a shift of the start signal.

* * * * *